Patented May 6, 1952

2,596,072

UNITED STATES PATENT OFFICE 2,596,072

PROCESS OF SELECTIVELY REDUCING FERROUS CHLORIDE IN THE VAPOR PHASE FROM A GASEOUS MIXTURE OF MANGANESE AND FERROUS CHLORIDE

Marion Ernest Graham, Parma, and Edward A. Beidler, Columbus, Ohio; said Beidler assignor, by mesne assignments, to Henry L. Crowley & Co., Inc., West Orange, N. J., a corporation of New Jersey No Drawing. Application March 28, 1951, Serial No. 218,064

5 Claims. (Cl. 75—34)

The present invention relates to the process of selectively reducing ferrous chloride in the vapor phase from a gaseous mixture of manganese and ferrous chlorides ($MnCl_2$ and $FeCl_2$), and more particularly to the selective reduction of ferrous chloride from such a gaseous mixture by hydrogen, so as to produce substantially pure iron.

It has been known for a considerable time that ferrous chloride may be reduced by hydrogen, at least in the solid phase. Work has also been done on the reduction of ferrous chloride in the liquid and gaseous phases by hydrogen.

The prior art is not altogether clear in regard to the reducibility of manganese chloride by hydrogen. Mellor, 1932 edition, volume 12, page 356, states that manganese chloride is not reducible by hydrogen. On the same page of Mellor, another researcher is said to state that manganese chloride may be reduced to some extent by hydrogen. From the original article of this other researcher, it appears that the reaction proceeds very slowly and only to a slight extent. Research work done incident to the development of the present invention seems to show that manganese chloride can be reduced by hydrogen, but that this reaction is difficult and slow and appears to proceed toward an equilibrium, which is not only slowly attained, but also represents a relatively small percentage reduction.

The only prior art known, wherein mixed ferrous chloride and manganese chloride were attempted to be reduced simultaneously, is the patent to Kinney, No. 2,290,843, granted July 21, 1942. In this patent mixed manganese chloride and iron chloride are taught to be reduced in the solid phase by a hydrogen-containing gas, in a manner such that both the manganese and iron are completely reduced. The research work done in accordance with the present invention with respect to vapor phase reduction is contrary to the teachings of this patent.

The present invention may, therefore, be summarized as comprising the process of selectively reducing ferrous chloride from a gaseous mixture of the vapors of ferrous chloride and manganese chloride to form substantially pure metallic iron. The chlorides may be mixed with any amount of other inert gases, such as nitrogen, or any other gas or gases which will not affect the desired reaction.

The hydrogen used as the reducing agent may have one or more inert gases admixed therewith, such as nitrogen and/or a small amount of water vapor. The temperature for the reaction may be from a minimum of about 800° C. up to a temperature at which the iron produced will be molten. In other words, the temperatures in accordance with the present invention, should not equal, or exceed, the melting point of iron.

In order that the iron produced be substantially pure (not over about 3% manganese), rather than mixed with some manganese, which is found to be somewhat reducible if its chloride is present in sufficient amount in the vapor, the weight ratio of manganese chloride to ferrous chloride in the vapor of the mixed chlorides should not exceed about 3:2; or conversely, the ratio of ferrous chloride to manganese chloride should be at least about 2:3. If the product to be made is desired to be at least about 99% or more pure iron, the weight ratio of ferrous chloride to manganese chloride should be at least about 5:3.

The detailed requirements of the process will now be described. The possible variations in the raw material composition including the mixed chlorides have been adequately discussed. The mixed chlorides may be produced in any way, or introduced into a reducing zone, which may comprise any suitable apparatus in which the reaction may be carried on continuously or intermittently. The mixed vapors of $FeCl_2$ and $MnCl_2$, may be produced at any place, either in the reducing zone itself or in some other place and conducted thence into the reducing zone, either alone or admixed with one or more gases, which are inert insofar as the present reaction is concerned, for example, nitrogen. In this way, for example, it is possible, by reason of the vapor pressure of these chlorides at a relatively high temperature, to operate the process at a temperature below the boiling points of both $FeCl_2$ and $MnCl_2$ and yet operate as a vapor phase reaction.

The gas to be used as the reducing gas must either consist of or contain hydrogen. Tests have been made as set forth in the examples following, wherein both essentially pure hydrogen was used as the reducing gas and in which the hydrogen was diluted with an equal quantity of nitrogen, the results showing that the diluent gas is not critical, but that there must be sufficient hydrogen to carry on the desired reaction.

Furthermore, various ratios (mol or by volume) of hydrogen to $FeCl_2$ vapor have been experimented with, between about 5:1 and about 20:1, as set forth in the following examples, indicating that this ratio also is not critical as affecting the selectivity of the reduction.

The temperature limits chosen for the reaction include as the low temperature limit about 800° C. This temperature is selected as about that at which any substantial amounts of the vapors of FeCl₂ and MnCl₂ can be maintained as such in a gaseous mixture. This lower limit is not critical as to the selectivity of the reduction reaction, but is dictated primarily by practical considerations as it bears on the amount of diluent gases required to be present.

The reaction of reducing ferrous chloride vapor with hydrogen to form metallic iron and HCl is a reversible one, proceeding toward an intermediate equilibrium end point, which approaches 100% reducibility, but is never as complete as that. It has been found, however, that when a relatively large amount of hydrogen is present as compared with the amount of ferrous chloride, the equilibrium end point of the reaction approaches more nearly 100% reduction of the ferrous chloride. This end point is also affected by temperature.

As far as the reducibility of manganese is concerned, whenever the weight proportions of ferrous chloride to manganese chloride are at least 5:3, the amount of manganese chloride reduced is not over about 1% of the total reduced metallic product. For a typical set of reducing conditions in which the reaction temperature is about 1050° C. and the H₂ present is 5 times that required for complete reduction of the entire charge of ferrous chloride, a final product containing 99% iron and 1% manganese was produced. As the proportion of manganese chloride to ferrous chloride is increased above a 3:5 ratio, progressively more of the manganese is reduced. For the purpose of the present application, a limiting ratio of 2:3 by weight of ferrous chloride to manganese chloride is given as the limit of the scope of the claims, for the reason that at this proportion, the iron produced is about 97% pure, the balance being principally manganese. As the present invention is directed, from one point of view at least, to the production of substantially pure iron, products containing less than about 97% iron are not to be considered within the purview of the present invention. These same principles apply considering the present invention as having a purpose of effecting a relatively complete separation between iron and manganese.

The high limit of temperature for the reaction is chosen as the melting point of iron, as above this temperature the iron produced would be in the form of tiny liquid droplets; and a desired separation of these droplets from the gaseous products of the reaction is relatively more difficult than is the separation of the solid iron from the remaining materials. Thus, the present invention is restricted in its scope to the reaction in question in which the iron is produced in solid form. In the normal conduct of the reaction, this iron is produced as a very fine powder, the particles of which may be, for example, of the order of magnitude of one micron in size.

*Example 1*

In order to illustrate the effect of the ratio of FeCl₂ to MnCl₂ in the material to be treated upon the purity of the reduced iron product obtained by a selective reduction reaction and upon the completeness of the separation, comparative tests were made with the following experimental results:

A mixture of FeCl₂ and MnCl₂ vapors containing FeCl₂ and MnCl₂ in the weight ratio of one part of FeCl₂ to 10 parts of MnCl₂ (not within the purview of this invention) was reduced with hydrogen at a temperature of about 1100° C. During the course of the reduction, a product was obtained containing about 83% metallic iron and the balance manganese. Although such a product might be useful for some purposes, it is not considered to be within the purview of the present invention, in view of the objects of this invention.

Where under the same conditions, as aforesaid, a mixture of chloride vapors containing two parts of FeCl₂ to 3 parts of MnCl₂ by weight was similarly reduced to give a product containing about 97% metallic iron and the balance manganese. Thus, in accordance with the present information based on experimental tests, if substantially pure metallic iron, that is, iron of at least about 97% purity, is to be produced by vapor phase selective reduction of FeCl₂ and MnCl₂ mixtures, it is necessary that the weight ratio between the FeCl₂ and MnCl₂ be at least about 2:3.

If it is desired to produce iron of even higher purity, i. e., containing about 99% or more metallic iron, by vapor phase selective reduction, it has been found necessary that the chloride mixture employed contain a major part of FeCl₂ and a minor part of MnCl₂ in a ratio of at least 5:3. When a vapor containing the two chlorides in a weight ratio of 5:3 was reduced by hydrogen at temperature of about 1100° C., there was obtained a reduced product containing about 99% metallic iron and the balance principally manganese. Where a vapor mixture was used containing FeCl₂ and MnCl₂ in the weight ratio of 10:1, metallic iron having a purity of well over 99% iron and only about 0.1% manganese was obtained.

*Example II*

The effect of the presence of neutral gas, such as nitrogen, in the reduction atmosphere, does not apparently impede or retard either the extent of the desired reaction or its degree of selectivity, provided hydrogen is present in sufficient quantity. This fact is illustrated by a comparison between two tests, both carried out on chloride vapor mixtures containing FeCl₂ and MnCl₂ in the weight ratio of 10:1 and reduced at a temperature of about 1100° C. in the vapor phase. In the first of these tests, pure hydrogen was reacted with the vapor mixture in the proportion of 20 mols of hydrogen per mol of mixed chloride vapors introduced. Only a very small amount of the MnCl₂ was reduced to metallic manganese, giving a reduced product containing about 99.8% metallic iron.

In another test carried out under the same conditions of temperature, mol ratio of hydrogen to mixed chlorides, except that the hydrogen was diluted with an equal volume of nitrogen, only a very small amount of the MnCl₂ present was reduced to metallic manganese, giving a reduced product containing about 99.8% metallic iron and the balance principally manganese. From these tests, it may be concluded that the addition of an inert gas, as nitrogen, to the reducing gas, as a carrier, or for other purposes, does not substantially impede the selectivity of the desired reaction, provided that a sufficient amount of hydrogen is present to carry on the reduction.

*Example III*

During the course of the desired selective reduction reaction, it is, of course, desirable to contact at least a stoichiometric amount of hydrogen with the chloride mixture in order that the reaction may approach completion from a strictly chemical point of view. However, it has been found generally desirable to use a considerable excess of hydrogen. In a vapor phase reduction, this excess preferably amounts to at least about 5 mols of hydrogen per mol of mixed chloride vapor. A comparison of the following experimental results illustrates that the amount of this excess is not particularly critical, as it does not appreciably affect the reaction as to the degree of selectivity. Thus, where a mixture of $FeCl_2$ and $MnCl_2$ vapors in a weight ratio of $FeCl_2$ to $MnCl_2$ of 10:1 was introduced into a reduction zone at a temperature of about 1100° C. with hydrogen, the gases being in the ratio of about 5 mols of hydrogen per mol of mixed chloride vapors, a substantially negligible amount of the $MnCl_2$ was reduced to metallic manganese, to give a reduced product containing about 99.8% metallic iron.

In another test conducted under the same conditions and on the same chloride mixture, except that the hydrogen was introduced at a ratio of about 20 mols of hydrogen per mol of chloride vapor, still only a very small amount of $MnCl_2$ was reduced to metallic manganese, to give a reduced product containing about 99.8% metallic iron.

While the process has been described in its essential principles, and some variations and equivalents have been suggested, it is desired that all equivalents of the subject matter herein particularly taught shall be considered within the purview of the present invention. As such, the claims are to be construed validly as broadly as the state of the prior art permits.

What is claimed is:

1. The process of selectively reducing ferrous chloride from a gaseous mixture, the essential active ingredients of which are the vapors of manganese chloride and ferrous chloride, and in which the weight ratio of ferrous chloride to manganese chloride is at least about 2:3, to form substantially pure metallic iron, which comprises the steps of contacting the mixed vapors of ferrous and manganese chlorides in a reducing zone with a gas, the essential active reducing ingredient of which is hydrogen, and maintaining the temperature of said chlorides and said gas in said reducing zone between about 800° C. and the melting point of iron.

2. The process of selectively reducing ferrous chloride from a gaseous mixture, the essential active ingredients of which are the vapors of manganese chloride and ferrous chloride, and the weight ratio of ferrous chloride to manganese chloride is at least about 2:3, to form substantially pure metallic iron, which comprises the steps of introducing the mixed vapors of ferrous and manganese chlorides into a reducing zone, passing into said zone into contact with the chlorides introduced thereinto a gas, the essential active reducing ingredient of which is hydrogen, and maintaining the temperature of said chlorides and said gas in said reducing zone between about 800° C. and the melting point of iron.

3. The process in accordance with claim 1, in which the vapors of the mixed chlorides include ferrous chloride vapor and manganese chloride vapor in the ratio of at least 5:3, to produce a reduced material which is over 99% iron.

4. The process according to claim 1, wherein the temperature in said reducing zone is maintained at least as high as the boiling points of ferrous chloride and of manganese chloride, both at atmospheric pressure.

5. The process in accordance with claim 2, wherein said chlorides are vaporized and are passed into said reducing zone mixed with an inert gas, and in which the temperature of said chlorides in said reducing zone is such, in view of the pressure existing in said zone, that said chlorides may exist in the form of vapors mixed with said inert gas.

MARION ERNEST GRAHAM.
EDWARD A. BEIDLER.

No references cited.